United States Patent
Geromini et al.

(10) Patent No.: US 6,268,007 B1
(45) Date of Patent: Jul. 31, 2001

(54) PROCESS FOR THE MANUFACTURE OF A COMPOSITE CONSUMABLE PRODUCT BY DOUBLE EXTRUSION

(75) Inventors: Osvaldo Geromini; Werner Pfaller, both of Orbe; Annmarie Bengtsson-Riveros, Chexbres; Ernst Heck, Vufflens-La-Ville., all of (CH); John T. Farnsworth, St. Joseph, MO (US)

(73) Assignee: Nestec S.A., Vevey (CH)

( * ) Notice: Subject to any disclaimer, the term of this patent is extended or adjusted under 35 U.S.C. 154(b) by 82 days.

(21) Appl. No.: 09/667,441

(22) Filed: Sep. 22, 2000

(30) Foreign Application Priority Data

Sep. 22, 1999 (EP) .................................. 99118679

(51) Int. Cl.⁷ ...................................................... A23P 1/00
(52) U.S. Cl. ............................................. 426/516; 426/448
(58) Field of Search .................................. 426/516, 448, 426/449; 425/204

(56) References Cited

U.S. PATENT DOCUMENTS

| | | | |
|---|---|---|---|
| 3,764,715 | 10/1973 | Henthorn et al. | 426/273 |
| 5,750,173 | 5/1998 | Kazemzadeh | 426/516 |
| 5,891,502 | 6/1999 | Heck et al. | 426/516 |
| 5,891,503 * | 4/1999 | Heck et al. | 426/516 |

FOREIGN PATENT DOCUMENTS 0 626 138    11/1994    (EP) .

* cited by examiner

*Primary Examiner*—George C. Yeung
(74) *Attorney, Agent, or Firm*—Pennie & Edmonds LLP

(57) ABSTRACT

A process for manufacturing a composite consumable product by double extrusion, wherein a liquid or pasty consumable substance is prepared in a first section of a twin-screw extruder, a plasticizable consumable substance is cooked-extruded in a second section of the twin-screw extruder, wherein the first and second sections are separated dynamically, to provide at least one strand of a cooked-extruded mass that is cut into pieces. The liquid or pasty consumable substance is added to the cooked-extruded mass to provide pieces of a composite consumable product.

20 Claims, 6 Drawing Sheets

PROCESS FOR THE MANUFACTURE OF A COMPOSITE CONSUMABLE PRODUCT BY DOUBLE EXTRUSION

FIELD OF THE INVENTION

The present invention is directed to a process and a device for manufacturing a composite consumable product by double extrusion.

BACKGROUND ART

EP 0,626,138 (Quaker Oats) discloses a process for manufacturing instant cereals, wherein a mixture based on cereal flour and water is cooked-extruded. The cooked-extruded mixture, to which pieces of food substance have been added, is shaped into flakes, the flakes toasted, coated with a sugar syrup to form a film on the surface thereof, and then dried.

U.S. Pat. No. 3,764,715 (Quaker Oats) discloses a process for manufacturing a coated instant cereal, wherein a mixture based on cereal flour and water is prepared, the mixture is cooked-extruded-expanded in the form of a tubular strand using an extruder equipped with a coextrusion die comprising an annular outlet orifice surrounding a central outlet orifice. A syrup is injected inside the tubular strand via the central outlet orifice. The cereal strand comprising the sugar syrup is cut into pieces at the die face, and the pieces are then dried so that the syrup which is present in the pieces diffuses from the inside towards the outside to form a film of dry syrup around the pieces.

EP 0,815,729 (Société des Produits Nestlé S.A.) discloses a process for manufacturing a foodstuff by extrusion, wherein a first food substance to be processed is introduced into a first section of a twin-screw extruder, a second food substance to be processed is introduced into a second section of the twin-screw extruder separated dynamically from the first twin screw extruder, each food substance is processed independently in their section of the extruder and the two masses of food substance are extruded by being passed through at least one die and the extruded or coextruded products are cut up.

There remains a need, however, for a process and device for manufacturing composite consumable products that is simple and can be well controlled. The present invention provides such a device and process.

SUMMARY OF THE INVENTION

The invention is directed to a process for preparing a composite consumable food product by double extrusion. The process involves the steps of introducing one or more first foodstuffs into a first section of a twin screw extruder and processing the first foodstuffs in the first section to provide a liquid or pasty consumable substance; introducing one or more second foodstuffs into the second section of the twin-screw extruder and processing the second foodstuffs to provide a plasticized consumable substance, wherein the first and second sections off the twin screw extruder are separated by a dynamic separation device so that the first foodstuffs and the second foodstuffs can be processed separately; extruding the plasticized consumable substance to provide a strand of plasticized consumable substance; cutting the strand of plasticized consumable substance into pieces; and adding the liquid or pasty consumable substance to the plasticized consumable substance to provide the composite consumable food product.

The liquid or pasty consumable substance can be added to the plasticized consumable substance by coating the liquid or pasty consumable substance on the pieces of plasticized consumable substance. In one embodiment the liquid or pasty consumable substance can be coated on the plasticized consumable substance by coextruding the pasty or liquid consumable substance and the plasticized consumable substance through a die comprising a central orifice and a annular orifice wherein the plasticized consumable substance is extruded through the central orifice and the pasty or liquid consumable substance is extruded through the annular orifice so that the pasty or liquid consumable substance surrounds the strand of plasticized consumable substance. In another embodiment the liquid or pasty consumable substance is coated on the plasticized consumable substance after the strand of plasticized consumable substance has been cut by spraying the liquid or pasty consumable substance on the cut pieces of plasticized consumable substance while they are being mixed.

In another embodiment the liquid or pasty consumable substance can also be added to the plasticized consumable substance by coextruding the pasty or liquid consumable substance and the plasticized consumable substance through a die comprising a central orifice and a annular orifice wherein the pasty or liquid consumable substance is extruded through the central orifice and the plasticized consumable substance is extruded through the annular orifice so that the plasticized consumable substance surrounds the pasty or liquid consumable substance.

In yet another embodiment the liquid or pasty consumable substance is added to the plasticized consumable substance by injecting the liquid or pasty consumable substance into the plasticized consumable substance while the plasticized consumable substance is in the second section of the twin-screw extruder.

The process may further include the step of drying the composite consumable food product. The composite consumable food product may be dried to a moisture content of less than about 15 percent.

The second foodstuff may be wheat, barley, maize, rice flour, semolina, or mixtures thereof and water. The second foodstuff may further include one or more additional additives selected from the group consisting starch, sugar, fat or oil, a source of plant fiber, non-fatty milk solids from milk, vitamins, antioxidants, trace elements, flavorings, colorings, and mixtures thereof. The starch may be wheat, barley, rice, tapioca, potato, maize, or mixtures thereof. The sugar may be sucrose, fructose, glucose, or mixtures thereof.

The second foodstuff can have a water content of about 14 to 23 percent to provide a plasticized consumable substance that is expanded. The second foodstuff can also have a water content of about 24 to 36 percent to provide a plasticized consumable substance that is substantially non-expanded. The non-expanded plasticized consumable substance can be rolled and toasted to provide flakes.

The first foodstuff may be sugar, honey, water, or mixtures thereof and may further include milk powder, fruit or vegetable pulp or concentrate, cocoa powder, colorings, flavors, vitamins, trace elements, salt, spices, oils, materials or microorganisms with probiotic or prebiotic properties; functional plant extracts, or mixtures thereof. The sugar may be sucrose, fructose, dextrose, raw cane sugar, or mixtures thereof.

The first foodstuff may also be a protein hydrolysate and fat and may further include colorings, flavorings, vitamins, trace elements, and mixtures thereof.

DETAILED DESCRIPTION OF THE PREFERRED EMBODIMENTS

Figure 1:
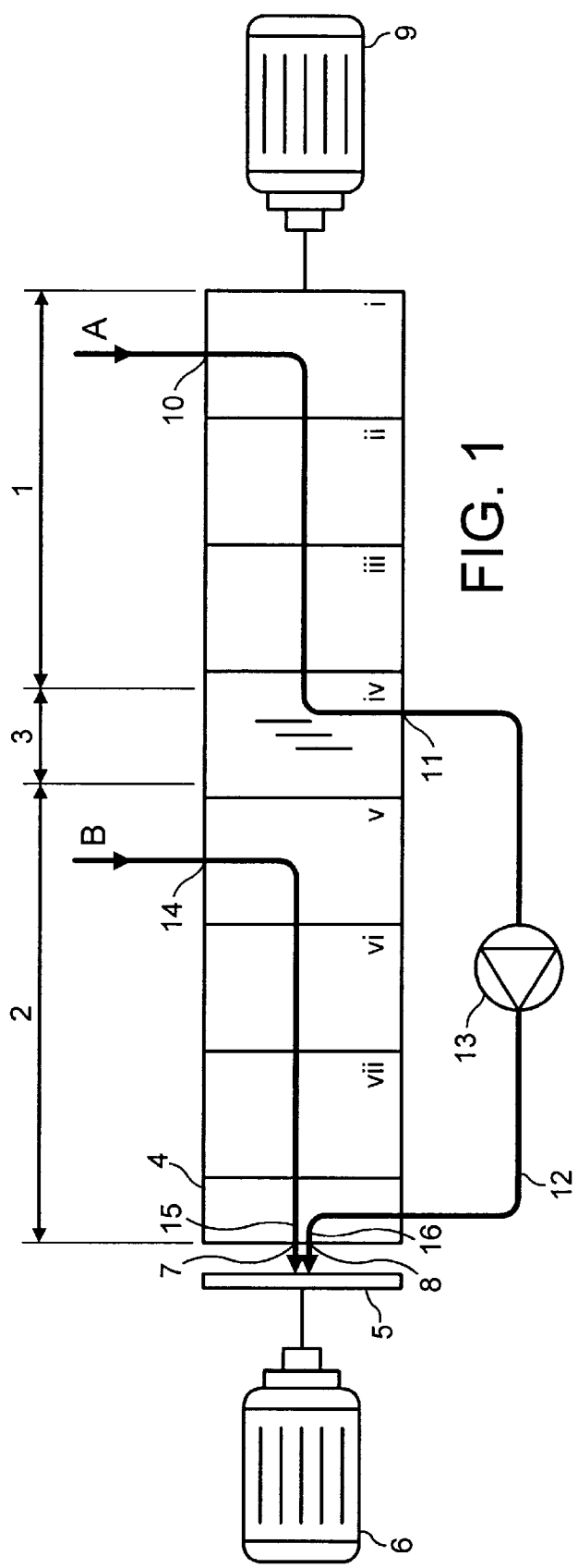
FIG. 1 diagrammatically represents a first embodiment of the device of the invention wherein the addition device is a coextrusion nozzle positioned directly at the outlet of the second section of the extruder.

The present invention is directed to a process wherein a liquid or pasty consumable substance is prepared in a first section of a twin-screw extruder, a plasticizable consumable substance is cooked-extruded in a second section of the twin-screw extruder, separated dynamically from the first section, to provide at least one strand of a cooked-extruded mass of the plasticized consumable substance, which is cut into pieces, and the liquid or pasty consumable substance is added to the pieces of the cooked-extruded mass to provide a composite consumable product.

The present invention is also directed to a device for carrying out the process of the invention. The device comprises a twin-screw extruder separated into two distinct sections by a dynamic separation device, at least one die, a cutter, and a device for adding a liquid or pasty substance to a plasticized consumable substance to provide a composite consumable product.

The process and device of the invention provides a simplified and particularly well-controlled method for manufacturing composite consumable products.

The phrase "dynamic separation device," as used herein, means a device that effectively separates the liquid or pasty consumable substance in the first section of a twin-screw extruder from the plasticizable consumable substance in the second section of the twin-screw extruder.

The phrase "consumable substance," as used herein, means a substance that can consumed by human beings and/or a substance that can be consumed by animals including, but not limited to, household animals such as dogs or cats, wild animals, and animals raised for their meat such as farm animals and cattle.

The phrase "composite consumable product," as used herein, means a consumable product that comprises at least two separate food stuffs that have been combined to form a single edible product wherein one of the food foodstuffs is a platicizable consumable substance, such as, for example a cooked cereal product, and the other food stuff is a liquid or pasty consumable substance (as a coating, a filling, or an impregnating component). The composite consumable product can be, for example, a coated product, a coextruded product with a soft interior and crunchy exterior, or a composite product impregnated throughout its body.

The phrase "plasticizable consumable substance," as used herein encompasses all the components introduced into the second section of the extruder and cooked-extruded at least over a portion of this section. The components may be added separately, simultaneously, or successively and may also be combined together before being added to the second section of the extruder.

The term "plasticizable," as used herein means that the foodstuff becomes a hot plastic mass when it is subjected to the basic cooking extruding process (i.e., mixing, compressing, shearing by means of intermeshing screws) under high temperature and pressure.

The phrase "liquid consumable substance" and "pasty consumable substance," as used herein, means a substantially flowable consumable substance, such as, for example, a free flowing low viscosity liquid or a syrup. Liquid consumable substance are free flowing low viscosity liquids. The pasty consumable substance has a higher viscosity than a free flowing liquid consumable substance and shows some resistance to flow.

Any plasticizable consumable substance from which it is possible to produce products by cooking-extrusion including, but not limited to, products intended for humans such as, breakfast cereals, cereals for infants, snacks, breadcrumbs, confectionery products, and products intended for animals such as dry pet food, for example, may be the starting food substance for the process of the invention. The plasticizable consumable substance can, for example, be based on milled cereal and water and can comprise as the major component a cereal flour or semolina. Preferably the plasticizable consumable substance comprises wheat, barley, oats, maize, rice flour, semolina, or a combination thereof and water.

The plasticizable consumable substance can additionally comprise one or more of starch, sugar, fat or oil, a source of plant fiber, non-fatty solids from milk, or combinations thereof. Preferably the starch is wheat, barley, rice, tapioca, potato, maize starch, or a mixture thereof. Preferably the sugar is sucrose, glucose, fructose or a mixture thereof. Preferably the oil or fat is butter oil, palm kernel fat, ground nut or maize oil or fat, or a combination thereof. Preferably the source of plant fibre is bran. Preferably the nonfatty solids from milk is skimmed milk powder. The plasticizable consumable substance can additionally comprise additional additives including, but not limited to, vitamins, trace elements, antioxidants, flavorings, colorings, and combinations thereof. The plasticizable consumable substance can also comprise, in particular in the case where it is more intended for consumption by pets, leguminous flour or semolina, such as soya, meat or fish meal, hydrolysate, tallow, or mixtures thereof.

The components of the plasticizable consumable substance and their respective proportions can be introduced into the second section of the extruder either individually or as a premix.

The plasticizable consumable substance is cook-extruded in the second section of the extruder under conditions of pressure, shear, and temperature so that the final product has the desired characteristics. In particular it is possible to vary the cooking-extruding conditions so as to vary the water content and the degree of expansion that is desired in the extruded product. For example, it is possible to cook-extrude a plasticizable consumable substance having a water content of between about 14 to 23% in order to obtain an expanded product. Preferably, the expanded product exhibits an expansion coefficient of from about 2 to 10 and more preferably from between about 2 and 5. It is also possible to cook-extrude a plasticizable consumable substance exhibiting a water content of about 24 to 36% in order to obtain a substantially non-expanded or only slightly expanded product. By substantially non-expanded is meant that the volume of the extrudate does not increase more than a few percent after exiting the extruder and has an expansion coefficient of less than about 2. The non-expanded or only slightly expanded product, which has been cut up, can be converted into flakes by rolling and toasting, for example. One of ordinary skill in the art may readily determine the cooking-extruding conditions to obtain specific characteristics in the extruded product.

The liquid or pasty consumable substance is prepared in the first section of the extruder with stirring and at an appropriate temperature so that the ingredients are well mixed and to assure that the mixture has good fluidity so that it can be pumped. Conditions may be chosen to avoid or, if appropriate, promote reaction between components of the liquid or pasty consumable substance. The reactions may be enzymatic or nonenzymatic reactions.

The resulting liquid or pasty consumable substance can be added in various ways to the cooked-extruded plasticizable consumable substance. In particular by coating the plasticizable consumable substance, coextrusion of the plasticizable consumable substance and the liquid or pasty consumable substance, or impregnating the plasticizable consumable substance throughout with the liquid or pasty consumable substance.

The liquid consumable substance for coating is prepared in the form of a syrup. When the liquid consumable substance is intended for human consumption it preferably comprises sugar, honey, water, or mixtures thereof. The liquid consumable substance may further comprise additional components, including, but not limited to milk powder, fruit or vegetable pulp or concentrate, cocoa powder, colorings, flavors, vitamins, trace elements, salt, spices, oils, or mixtures thereof. In addition, materials or microorganisms with probiotic or prebiotic properties; functional plant extracts, such as guarana, ginseng, acerola, rosehip, cola, and garcinia extracts, indeed even procyanidol oligomers (P.C.O.) such as can be extracted from grape or strawberry seeds, can advantageously be added to the syrup.

Preferably the sugar is sucrose, fructose, dextrose, raw cane sugar, or a mixture thereof.

When the liquid consumable substance for coating is intended for animals it preferably comprises protein hydrolysate, vegetable extract, water, and mixtures thereof. In addition, it may further comprise one or more additional components, such as colorings, flavorings, vitamins, trace elements, and mixtures thereof.

A pasty consumable substance, intended for human consumption, preferably comprises minced meat, tomato sauces and or cheese (for savory products), almonds, hazelnuts, chocolate or jam (for sweet products), and mixtures thereof. The pasty consumable substance may further comprise one or more additional components, including but not limited to milk powder, fruit or vegetable pulp or concentrate, cocoa powder, colorings, vitamins, trace elements, flavorings, salt, spices, oils, and mixtures thereof. In addition, materials or microorganisms with probiotic or prebiotic properties; functional plant extracts, such as guarana, ginseng, acerola, rosehip, cola or garcinia extracts; indeed even procyanidol oligomers (P.C.O.) such as can be extracted from grape or strawberry seeds can advantageously be added to the pasty consumable substance.

A pasty consumable substance intended for pets preferably comprises protein hydrolysate and fat. Preferably the fat is tallow, molasses, or a mixture thereof. The pasty consumable substance may further comprise one or more additional components, including, but not limited to, colorings, flavorings, vitamins, trace elements, and mixtures thereof.

The pieces of cooked-extruded plasticizable consumable substance can be coated before or after they are cut up at the outlet of the extruder. To coat the cooked-extruded plasticizable consumable substance before they are cut up at the outlet of the extruder the cooked-extruded plasticizable consumable substance and the liquid or pasty consumable substance is coextruded through a die comprising an annular outlet orifice surrounding a central outlet orifice. A strand of cooked-extruded plasticizable consumable substance is extruded through the central orifice and the liquid or pasty consumable substance is distributed through the annular orifice around the cooked-extruded strand.

The pieces can also be coated after they have been cut up. In this embodiment provision is made to spray the liquid consumable substance onto the cut-up pieces while they are being mixed or tumbled.

In another embodiment the liquid or pasty consumable substance is encapsulated by coextruding the liquid or pasty consumable substance and the cooked-extruded substance through a die comprising an annular outlet orifice surrounding a central outlet orifice. The cooked-extruded substance is extruded as a strand or rope through the annular orifice and the liquid or pasty consumable substance is extruded through the central orifice to provide a rope or strand having the liquid or pasty consumable substance inside the cooked-extruded strand.

The cooked-extruded strand can also be impregnated with the liquid or pasty consumable substance throughout the strand by injecting the liquid or pasty consumable material into the second section of the extruder. Preferably the liquid or pasty consumable material is injected close to the outlet of the second section of the extruder but sufficiently upstream for it to be well mixed with the mass of plasticized consumable substance to be extruded before the mass is extruded. Advantageously the cooked-extruded strand is cut into pieces directly at the outlet of the second section of the extruder.

Optionally, the composite product resulting pieces can be dehydrated to a residual water content of less than about 15%, preferably less than about 10% and more preferably less than about 5%.

The device for carrying out the process according to the present invention comprises a twin-screw extruder separated into two distinct sections by a dynamic separation device, at least one die, a cutter, and a device for adding a liquid or pasty substance.

The dynamic separation device can be a blocking region wherein the twin screw has a reverse pitch and can also comprise cones positioned head-to-tail, i.e., one cone, for example the cone on the first screw of the has its broad part downstream, and the second cone, i.e., on the second screw has its broad part upstream.

Figure 7:
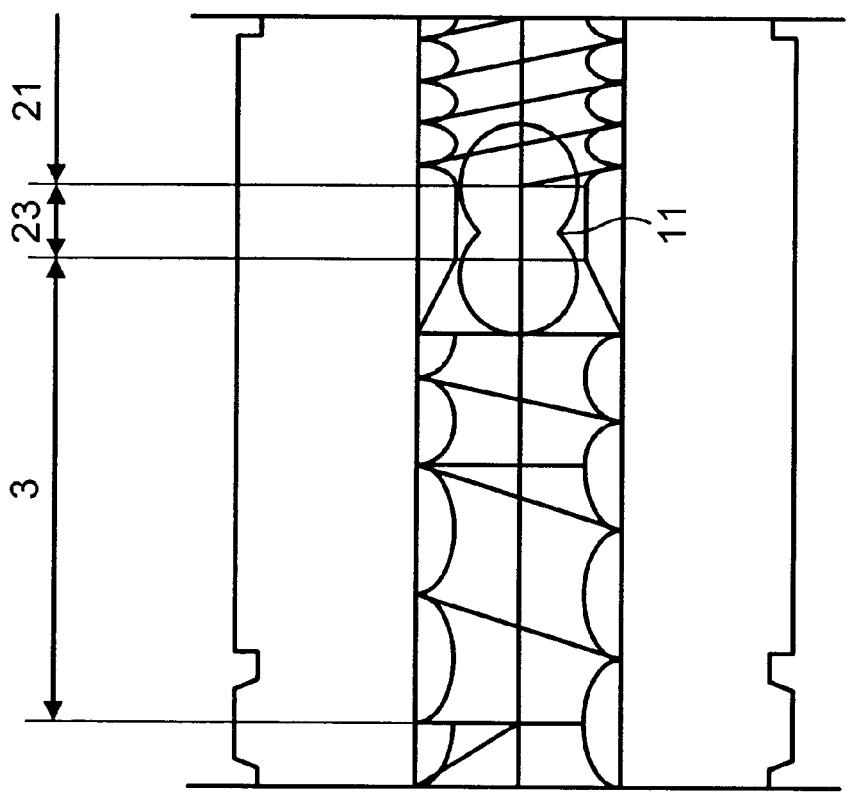
FIG. 7 represents in greater detail the embodiment of the outlet opening for the liquid or pasty consumable substance represented in FIG. 5.

The outlet opening of the first section of the extruder can entirely cover the outlet region of the twin-screw device and which overlaps, on either side, onto a compression region and onto a dynamic separation region as depicted in FIG. 7.

In one embodiment the outlet region comprises one or more bilobes on one screw and a collar on the other screw, the collar facing the outlet opening.

The outlet opening of the second section can be provided along the axis or on the side of the downstream end of the extruder, for example.

The outlet opening of the first section can be connected via a pipe to at least one coextrusion die provided at the outlet of the second section of the extruder. In another embodiment the outlet opening of the first section is connected to at least one spray nozzle provided in a device separate from the extruder. In yet another embodiment the outlet opening of the first section can be connected to at least one injection opening provided in the barrel of the extruder, preferably it is connected close to the outlet opening of the second section.

The outlet opening of the second section can emerge directly onto the die. The die can be an extrusion or coextrusion die through which the substance processed in the second section is extruded or pressed under the pressure exerted by the twin-screw device. The die can comprise one or more extrusion pipes emerging into one or more outlet orifices provided on a front wall of the die.

The cutter may be in the form of a multi-blade rotary cutter, preferably comprising 2–16 blades, rotating against the outlet orifice or orifices of the die, i.e., against the front wall of the die.

The addition device for adding the pasty or liquid substance is positioned at the outlet of the second section of the extruder in the form of at least one coextrusion die. In another embodiment the addition device for adding the pasty or liquid substance is positioned close to the outlet opening of the second section, upstream of the outlet opening, in the form of at least one injection opening provided in the barrel of the extruder. In yet another embodiment the addition device for adding the pasty or liquid consumable substance is positioned at the outlet or after the outlet of the extruder in the form of at least one spray nozzle included in a device separate from the extruder.

The addition device can be separate from the extruder and can be a hollow cylindrical drum rotating about a generally horizontal axis that includes, in its upper part or its side part, at least one spray nozzle capable of spraying a liquid consumable substance over the extruded plasticized consumable substance while it is mixed or tumbled in the cylinder. A preferred addition device of this type is a rotary cylindrical drum, having a first open part that surrounds the die of the extruder and the cutter, and a second non-open part that extends downstream of the cutter and having, in its upper part or in a side part, at least one spray nozzle capable of spraying a liquid consumable substance directly over the pieces of product ejected by the cutter. In this preferred embodiment, the cutter can advantageously be driven by a hydraulic motor which is smaller in size than a conventional electric motor.

A drying device may also be provided. For example, the dryer may be a hot-air drying tunnel.

A feed device for each section of the extruder can be in the form of one or more feed openings provided in the barrel of the twin-screw device, starting from the upstream end of the extruder for the first section and, for the second section, starting from a transportation region following the blocking region of the twin-screw device.

The geometry of the screws can varied for each section of the extruder to provide the desired properties in the the plasticizable consumable substance or the liquid or pasty consumable substance that is processed. The geometry of the screws may be readily determined by one of ordinary skill in the art.

It is possible in particular to provide successive and/or alternating transporting, transporting-mixing-dissolving, compressing-dissolving, or mixing-dissolving regions on the first section and successive and/or alternating transporting, compacting, compressing, kneading or mixing regions on the second section, of the extruder. In order to define these various regions, it is possible, for example, to vary the pitch and the handedness of the screws, the empty space defined in by the respective diameters of the shafts and the flights of the screws, or the insertion of bilobes of various shapes. It is also possible to divide each section of the extruder into several independent subdivisions, the temperature of which can be individually adjusted by circulating a cooling or heating fluid.

Finally, the mechanical energy needed to prepare the liquid or pasty consumable substance, to process the plasticizable consumable substance, to distribute or spray the liquid or pasty consumable substance, and to extrude the processed substance can be supplied by a single means for driving the screws of the twin-screw device. The mechanical energy may be provided, for example by an electric motor. In order to ensure that the processed plasticizable consumable substance passes through the die, the motor can be assisted or the load on it can be lightened using a positive-displacement pump, such as a gear pump, connected upstream of the die.

More precise control of the spraying and the injection of the liquid or pasty consumable substance can be provided by connecting a positive-displacement pump between the outlet of the first section of the extruder and the spray nozzle, the coextrusion die, or the injection opening.

The device according to the invention is described below in greater detail with reference to the appended Figures. FIG. 1 illustrates an embodiment wherein the device comprises a twin-screw extruder separated into two distinct sections 1 and 2 by a dynamic separation device 3, at least one die 4, cutter 5, 6, an addition device 7, 8, and a drying device (not represented). The twin-screw device is driven by a motor 9 and is enclosed in a jacketed barrel subdivided into seven compartments i–vii, in each of which can be circulated a cooling or heating fluid. In this embodiment of the device the components of the liquid or pasty consumable substance A are introduced into the first section 1 through a feed device comprising at least one feed opening 10 provided in the first compartment i of the barrel. The liquid or pasty consumable substance prepared in the first section 1 exits from this section via an outlet opening 11 provided in compartment iv of the barrel at the dynamic separation device 3. The opening 11 is connected to the die 4 via a pipe 12 which optionally passes through a positive-displacement pump 13 that makes it possible to inject the liquid or pasty consumable substance into an extrusion pipe 16 emerging into an annular or central outlet orifice 8.

A plasticizable consumable substance B is introduced into the second section 2 through a feed device comprising at least one feed opening 14 provided in the fifth compartment v of the barrel, downstream of the dynamic separation device 3. The mass of substance B processed in the second section 2 is pressed through an extrusion pipe 15 emerging into a central or annular outlet orifice 7.

In this first embodiment, the addition device is positioned at the outlet of the second section of the extruder in the form of a coextrusion die comprising the two extrusion pipes 15 and 16 emerging respectively into the central or annular orifice 7 and into the annular or central orifice 8. If the strand of plasticized consumable substance is extruded through the central orifice and a liquid or pasty consumable substance is distributed through the annular orifice the liquid pasty consumable substance surrounds the extruded strand. If the strand of plasticized consumable substance is extruded through the annular orifice and a liquid or pasty consumable substance is distributed through the central orifice then the liquid pasty consumable material is surrounded by the plasticized consumable substance. The resulting strand of composite product is cut up into pieces using the cutter 5. Preferably the cutter 5 is a rotary cutter that rotates against the outlet orifices of the die 4 and is driven by an electric motor 6. The resulting cut pieces can subsequently be dried, if appropriate, in a drying device (not represented).

Figure 2:
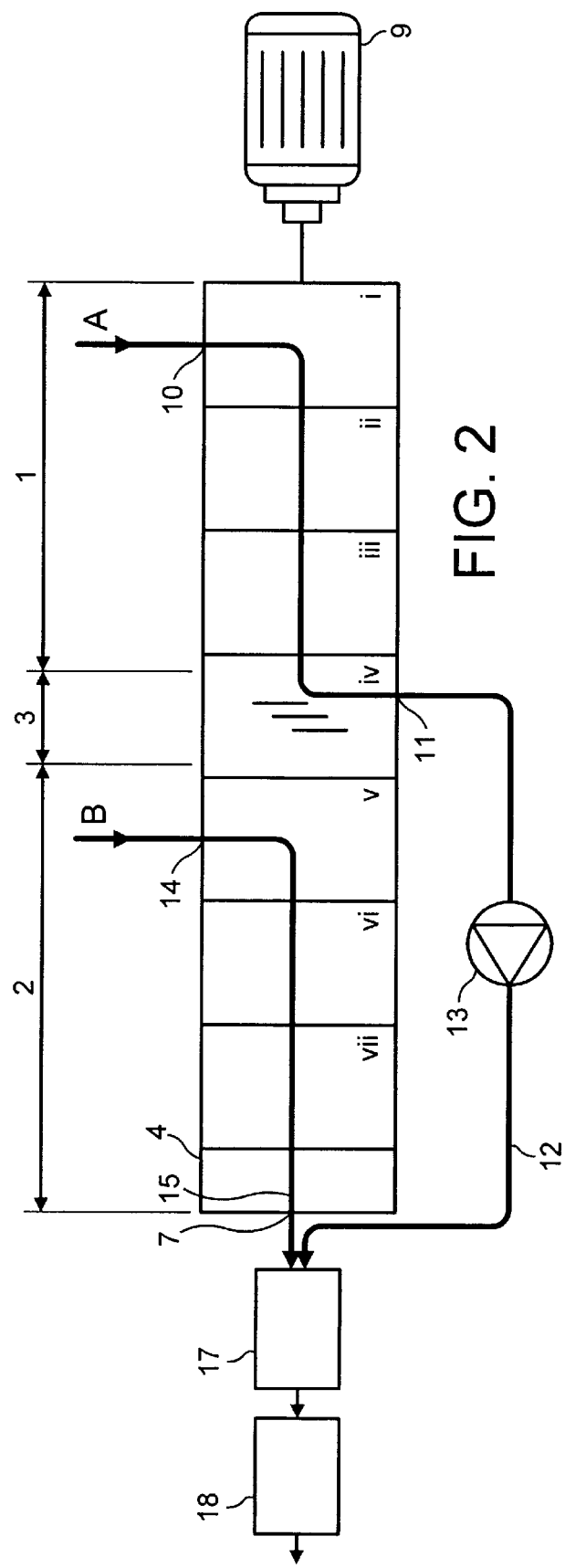
FIG. 2 diagrammatically represents a second embodiment of the device of the invention wherein the addition device is at least one spray nozzle included in a device that is separate from the extruder and positioned after the outlet of the extruder.

In the embodiment represented in FIG. 2, the device is analogous to that represented in FIG. 1, except that it comprises an addition device 17 positioned after the outlet of the extruder in the form of at least one spray nozzle included in a device separate from the extruder. The embodiment illustrated in FIG. 2 further comprises a drying device 18. The separate addition device 17 is in the form of a hollow cylindrical drum rotating about a substantially horizontal axis and having at least one spray nozzle (not represented) in its upper part or its side part capable of spraying the liquid consumable substance over the product to be coated while the product to be coated is mixed or tumbled in the cylinder 17. In this second embodiment of the device, a liquid consumable substance A is prepared in the first section and is injected into the spray nozzle via the pipe 12. A plasticizable consumable substance B is processed in the second section 2 and is pressed through at least one extrusion pipe 15 of the die emerging onto at least one outlet orifice 7. The resulting cooked-extruded strand plasticizable consumable substance B is cut up into pieces by cutting means (not represented) and the pieces are introduced or transported into the addition device 17 in order to be coated with the liquid consumable product sprayed over them by the spray nozzle (not represented). The coated pieces are subsequently dried in the drying device 18. The drying device 18 may be, for example, a hot air dryer.

Figure 3:
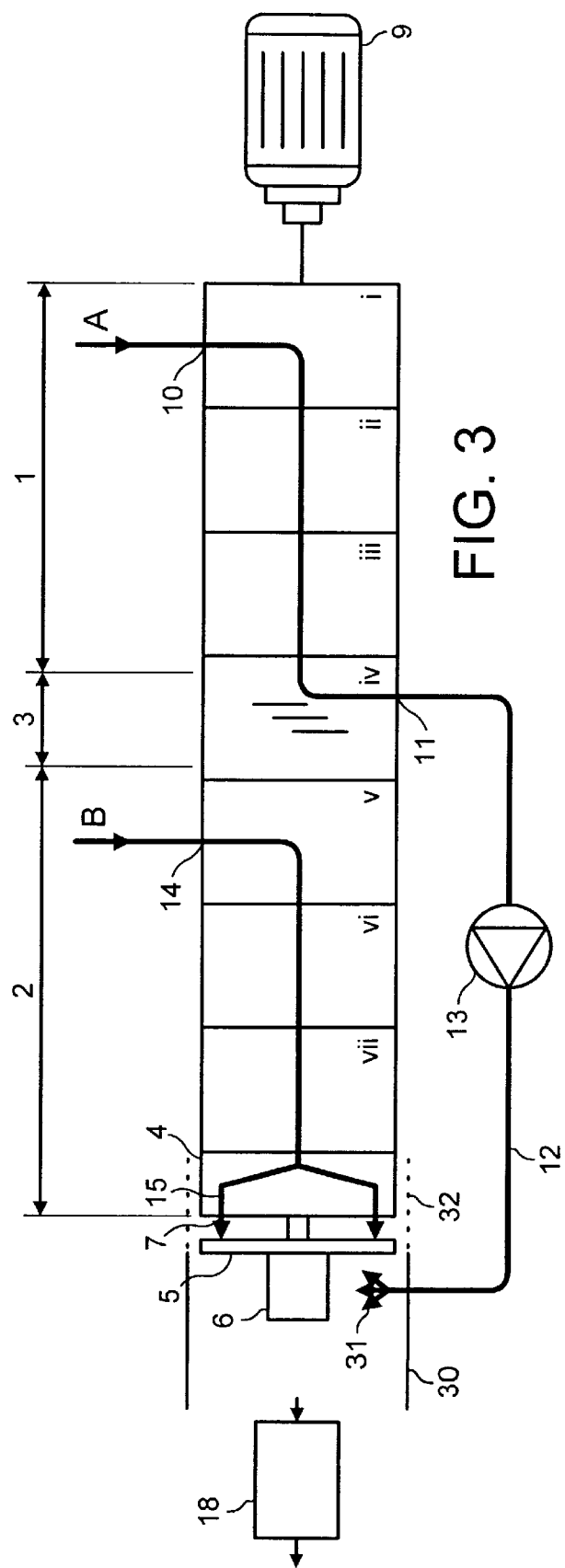
FIG. 3 diagrammatically represents a third embodiment of the device of the invention wherein the addition device is at least one spray nozzle included in a device separate from the extruder and positioned at the outlet of the extruder.

The embodiment illustrated in FIG. 3 is analogous to that illustrated in FIG. 1, except that it comprises an addition device 30, 31 provided at the outlet of the extruder in the form of at least one spray nozzle included in a device separate from the extruder and that it additionally comprises a drying device 18. In this embodiment a liquid consumable substance A is prepared in the first section 1 and is injected into at least one spray nozzle 31 via the pipe 12. A plasticizable consumable substance B is processed in the second section 2 and is pressed through at least one extrusion pipe 15 of the die emerging onto at least one outlet orifice 7. The resulting cooked-extruded strand of plasticizable consumable substance B is cut into pieces by cutter 5 attached to the die 4. Preferably the cutter 5 is a rotary cutter that rotates against the outlet orifices of the die 4 and is driven by a hydraulic motor 6. The addition device comprises at least one spray nozzle 31 provided in a rotary cylindrical drum 30 having a first open part 32 that surrounds the cutting means 5, motor 6, and die 4 and a second non-open part that extends downstream of the cutting means.

Figure 4:
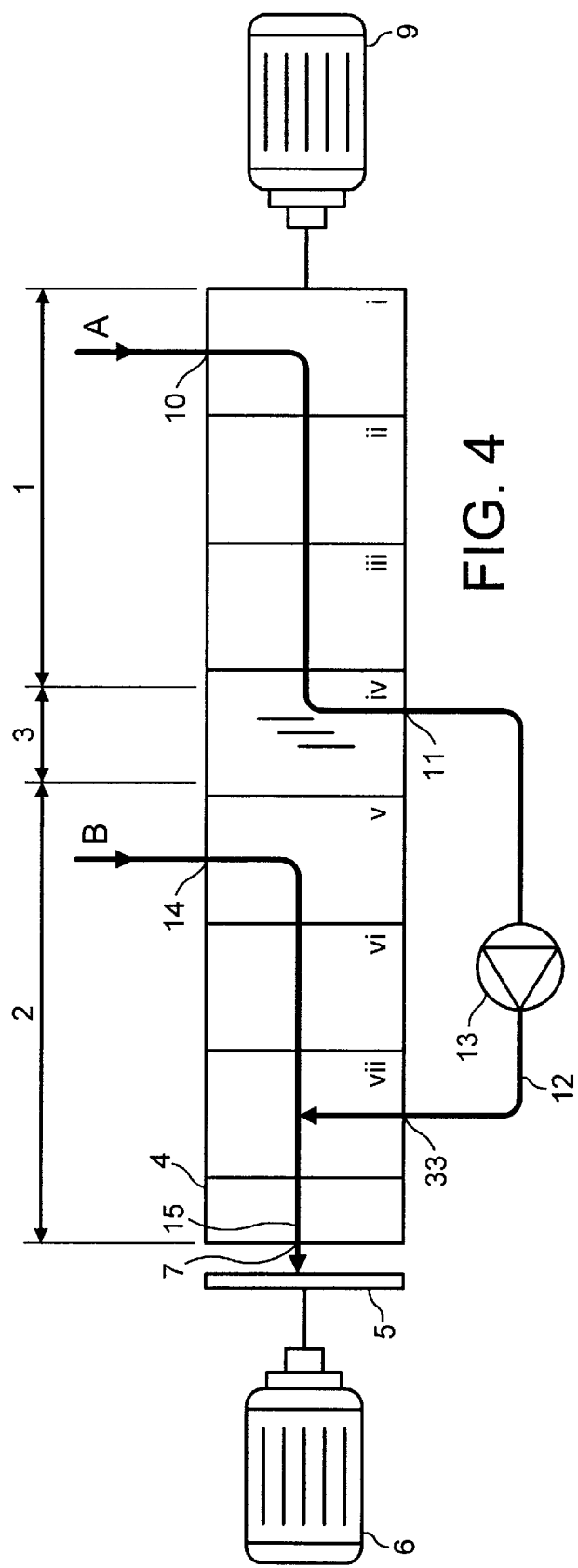
FIG. 4 diagrammatically represents a fourth embodiment of the device of the invention wherein the addition device is at least one injection opening positioned close to and upstream of the outlet opening of the second section of the extruder.

FIG. 4 illustrates yet another embodiment of the device of the invention. The embodiment illustrated in FIG. 4 is analogous to that illustrated in FIG. 1, except that it comprises an addition device provided upstream of the outlet of the extruder, in the form of at least one injection opening 33 in the barrel of the extruder. Preferably the at least one injection opening 33 is in the middle of the final compartment vii of the second section 2. In this embodiment a pasty consumable substance A is prepared in the first section 1 and is injected into the second section 2, preferably close to the outlet of section 2, but sufficiently upstream for it to be well mixed with a plasticizable consumable substance B processed in section 2 before the plasticizable consumable substance B is passed through at least one extrusion pipe 15 of the die emerging onto at least one outlet orifice 7. The resulting composite strand is cut into pieces by cutter 5. Preferably the cutter 5 is a rotary cutter that rotates against the outlet orifices of the die 4 and is driven by an electric motor 6. The resulting cut pieces can subsequently be dried, if appropriate, in a drying device (not represented).

Figure 5:
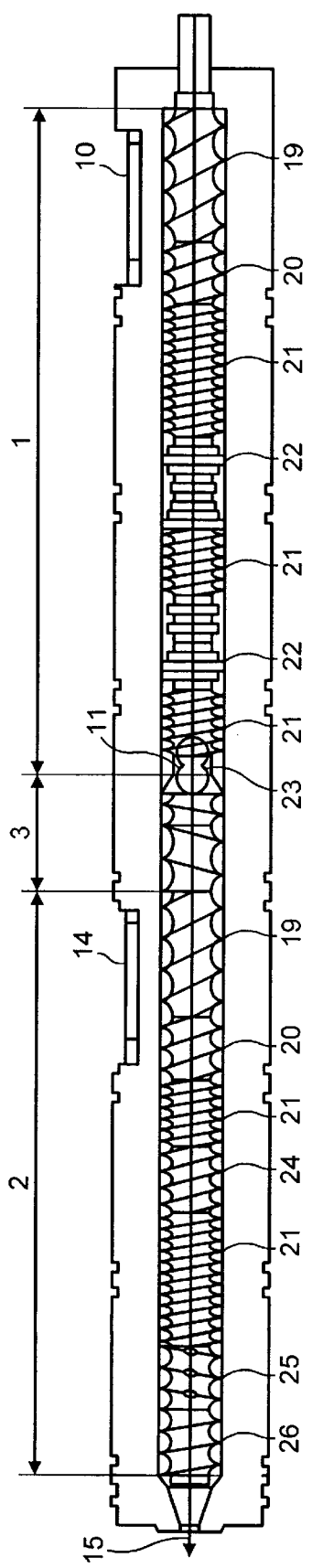
FIG. 5 is a diagrammatic view of the vertical section of an extruder of the device of the invention along the axis of the left-hand screw, illustrating a representative geometry for the screws of the device depicted in FIGS. 1–4.
Figure 6:
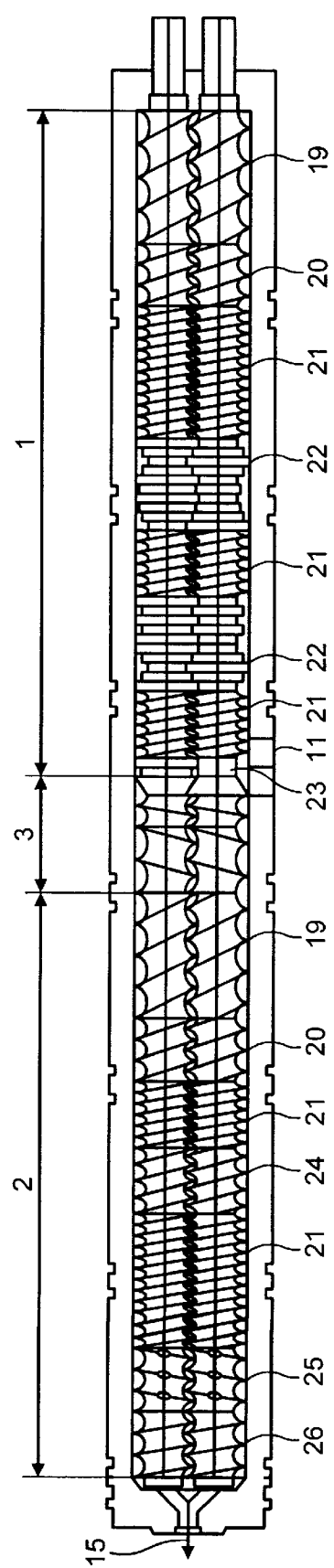
FIG. 6 is a diagrammatic view of the horizontal section of the extruder along the plane defined by the axes of the two screws, illustrating the same representative geometry for the screws as illustrated in FIG. 5.

FIGS. 5 and 6 diagrammatically illustrates a representative geometry of the screws used in the device of the invention. The screws illustrated in FIGS. 5 and 6 can be used without distinction in each of the devices illustrated in FIGS. 1 to 4. In section 1, the screws successively exhibit a transporting region 19 (200/100), a transporting-mixing-dissolving region 20 (100/66), a compressing-dissolving region 21 (200/33), a mixing-dissolving region 22 (140/various bilobes), a compressing-dissolving region 21 (100/33), a mixing-dissolving region 22 (150/various bilobes), a compressing-dissolving region 21 (100/33), a syrup outlet region 23 (two 15 mm bilobes on one screw, one 30 mm collar on the other screw), and a dynamic separating region 3 (30 mm cones, 50/−25, 100/−50).

In the section 2, the screws successively exhibit a transporting region 19 (200/100), a transporting region 20 (100/66), a compressing region 21 (100/33), a compressing region 24 (100/50), a compressing region 21 (200/33), a kneading region 25 (100/−33), and a compressing region 26 (100/35).

In the above description of the screws, the figures in brackets give the length of the region and the length of the pitch in mm for screws with a diameter of 88 mm and a distance between axes of 72 mm. The device in this instance is a Clextral BC-72 twin-screw extruder.

The illustrated geometry is given by way of example only and the device of the invention is not limited to screws with these dimensions. For example, other extruder models, in particular the BC-45 model (screw with a diameter of 55 mm and distance between axes of 45 mm) or the BC-92 model (screw with a diameter of 115 mm and a distance between axes of 92 mm) of the same series, may be used.

Preferably, the screw pitches are double, except for the reverse pitch of the blocking region, which is preferably single.

In contrast to the reverse pitch of the kneading region 25, which exhibits on its perimeter notches for the passage of the processed mass, the reverse pitch of the blocking region 3 does not exhibit any notches so that blocking region 3 is as efficient as possible in its role as dynamic separation device.

As is seen in more detail in FIG. 7, the outlet opening 11 of the first section 1 of the extruder has an axial oblong shape, in this instance in the shape of a figure eight, covering the entire length of the outlet region 23 (facing the collar) and overlapping onto the compression region 21 and the separation region 3 (facing the cones).

EXAMPLES

The invention is further defined by reference to the following examples describing in detail the process and device of the present invention. The examples are representative, and they should not be construed to limit the scope of the invention. All percentages and parts are by weight, unless otherwise indicated.

Example 1

Use is made of a device as illustrated in FIGS. 2 or 3 and 5–7, using a Clextral BC-72 type twin-screw extruder with a screw diameter of 88 mm and a screw length of 2100 mm. The addition device is a hollow cylindrical drum provided after the outlet of the extruder that rotates about a substantially horizontal axis and exhibits, in its upper part, three twin-fluid nozzles having an internal diameter of 2.5 mm. Alternatively, the addition device is a partially open rotary cylindrical drum that surrounds the die of the extruder and the cutter having, in a side part, a horizontal row of five spray nozzles, the furthest upstream spray nozzle being positioned at the cutter. The drying device is a hot air drying tunnel.

The syrup was prepared in the first section of the extruder by dissolving therein 60 kg/h of caster sugar in 13 kg/h of water. The temperature of the syrup or sugar solution is brought to 76° C. within the first section of the extruder.

To prepare the cereal base in the second section of the extruder, the following components are mixed therein (kg/h):

| | |
|---|---|
| Maize semolina | 84.0 |
| Wheat flour | 11.4 |
| Sucrose | 4.8 |
| Sodium chloride | 1.2 |
| Calcium carbonate | 0.6 |
| Oatmeal | 6.0 |
| Wheat starch | 12.0 |
| Palm kernel fat | 10.0 |
| Water | 13.0 |

The cereal base was prepared by combining the powders to form a dry-mixture. The dry mixture, the fat, and water are then subsequently mixed and the resulting mixture is then processed, i.e., it is cooked-extruded at 150° C. under 155 bar pressure with the screws of the extruder rotating at 218 rpm. The resulting thermoplastic mass is extruded through a die in the form of a front plate pierced with four cylindrical pipes each emerging onto a circular outlet orifice with a diameter of 5 mm. The resulting extruded-expanded cylindrical strands are immediately cut using a four-blade cutter rotating at 6000 rpm against the front wall of the die, the cutter being driven by a conventional electric motor (in the case where the addition device is positioned after the outlet of the extruder) or by a hydraulic motor integral with the die (in the case where the addition device is positioned at the die). The resulting expanded cereal pellets had a diameter of approximately 10 mm. The pellets were coated by spraying them with the syrup while mixing or tumbling them, the syrup being sprayed under the effect of a stream of air ejected from the nozzle at a pressure of 1.8 bar. The cereal pellets were dried with air at 113° C. to a residual water content of less than 3%. The final product was pellets of a light and crunchy sugar-coated breakfast cereal.

Example 2

A composite pet food with a soft interior and a crunchy exterior was prepared using the device illustrated in FIG. 1. In order to prepare a pasty consumable substance for the soft interior of the pet food the following components, in the following proportions (given as % by weight), were introduced into the first section of a twin-screw device (Clextral BC-72 type), and continuously mixed therein:

| | |
|---|---|
| Meat protein hydrolysate | 40 |
| Lecithin | 0.5 |
| Chicken fat | 45 |
| Molasses | 10.5 |
| Dye | 3 |
| Vitamins and trace elements | 1 |

In the first section, the screws had a length to diameter ratio of 9:1 (for a total length to diameter ratio of 20:1) and were composed of a transportation screw and mixing bilobe elements. The temperature of the barrel was maintained at approximately 49° C.

To prepare a plasticizable consumable substance, i.e., the cereal base for the crunchy exterior, in the second section of the twin-screw device, the following components were introduced therein, mixed therein, and continuously processed therein in the following proportions (given as % by weight):

| | |
|---|---|
| Milled wheat | 45 |
| Milled maize | 24 |
| Chicken meal | 13 |
| Soya flour | 13 |
| Vitamins | 1 |
| Trace elements | 0.5 |
| Tallow | 3.5 |

In the second section, the screws had a length to diameter ratio of 10:1 and were composed of a double-pitch screw element for transportation, a reverse pitch element for compression and shearing, and a trapezoidal single thread element for expulsion or pressing. The temperature of the barrel was maintained at approximately 120° C.

The consistency of the pasty substance for the soft interior was adjusted in the first section so that it was just capable of being pumped through the die and so that it would rapidly set as a solid after exiting from the die.

The food substance, plasticized and heated under the effect of the pressure, shear, and temperature in the second section, greatly expanded on exiting from the die and formed a shell which became solid and crusty during cooling and drying.

The pasty substance and the cereal base were coextruded at respective throughputs such that the ratio by weight of the soft interior to the crunchy exterior of the composite product was 40%:60%.

The activity of the water in the soft interior and that in the crunchy exterior were adjusted so that the interior remained soft and the exterior remains crunchy during a storage period of at least six months.

Example 3

A composite food which was impregnated throughout its body was prepared using a device as illustrated in FIG. 4.

To prepare an impregnating syrup in the first section of the twin-screw device (Clextral BC-72 type), mackerel flesh, an enzyme for its digestion, sucrose, and molasses were introduced therein and continuously mixed therein in the following proportions (given in % by weight):

| | |
|---|---|
| Mackerel flesh emulsion | 80 |
| Enzyme | 0.5 |
| Sucrose | 10 |
| Molasses | 9.5 |

In the first section, the screws had a length to diameter ratio of 9:1 (for a total length to diameter ratio of 20:1) and were composed of a transportation screw and mixing bilobe elements. The rotational speed of the screws was chosen such that the mackerel flesh was minced. The temperature of the barrel was maintained at 120° C.

In order to prepare the plasticizable consumable substance ,i.e., the cereal base, the following components were introduced into the second section of the twin-screw device, mixed therein, and processed therein continuously in the following proportions (given as % by weight):

| | |
|---|---|
| Wheat | 45 |
| Maize | 15 |
| Chicken meal | 17 |
| Soya | 14.3 |
| Vitamins | 1 |
| Trace elements | 0.5 |
| Dye | 3 |
| Tallow | 4.2 |

In the second section, the screws had a length to diameter ratio of 10:1 and were composed of a double-pitch screw element for transportation, a reverse pitch element for compression and shearing, and a trapezoidal single thread element for expulsion or pressing. The temperature of the barrel was maintained at approximately 120° C.

The impregnating syrup prepared in the first section was injected into the second section close to the outlet of the second section but sufficiently upstream for the syrup to be well mixed with the cereal base before it is extruded. The ratio by weight of the syrup to the cereal base in the composite product was 10%:90%. The resulting composite product had an appetizing mackerel flavor and was pleasant to eat, both for humans and for pets.

What is claimed is:

1. A process for preparing a composite consumable food product by double extrusion comprising
   introducing one or more first foodstuffs into a first section of a twin screw extruder and processing the first foodstuffs in the first section to provide a liquid or pasty consumable substance;
   introducing one or more second foodstuffs into the second section of the twin-screw extruder and processing the second foodstuffs to provide a plasticized consumable substance, wherein the first and second sections of the twin screw extruder are separated by a dynamic separation device so that the first foodstuffs and the second foodstuffs can be processed separately;
   extruding the plasticized consumable substance to provide a strand of plasticized consumable substance;
   cutting the strand of plasticized consumable substance into pieces;
   and adding the liquid or pasty consumable substance to the plasticized consumable substance to provide the composite consumable food product.

2. The process of claim 1, wherein the liquid or pasty consumable substance is added to the plasticized consumable substance by coating the liquid or pasty consumable substance on the pieces of plasticized consumable substance.

3. The process of claim 2, wherein the liquid or pasty consumable substance is coated on the plasticized consumable substance by coextruding the pasty or liquid consumable substance and the plasticized consumable substance through a die comprising a central orifice and a annular orifice wherein the plasticized consumable substance is extruded through the central orifice and the pasty or liquid consumable substance is extruded through the annular orifice so that the pasty or liquid consumable substance surrounds the strand of plasticized consumable substance.

4. The process of claim 2, wherein the liquid or pasty consumable substance is coated on the plasticized consumable substance after the strand of plasticized consumable substance has been cut by spraying the liquid or pasty consumable substance on the cut pieces of plasticized consumable substance while they are being mixed.

5. The process of claim 1, wherein the liquid or pasty consumable substance is added to the plasticized consumable substance by coextruding the pasty or liquid consumable substance and the plasticized consumable substance through a die comprising a central orifice and a annular orifice wherein the pasty or liquid consumable substance is extruded through the central orifice and the plasticized consumable substance is extruded through the annular orifice so that the plasticized consumable substance surrounds the pasty or liquid consumable substance.

6. The process of claim 1, wherein the liquid or pasty consumable substance is added to the plasticized consumable substance by injecting the liquid or pasty consumable substance into the plasticized consumable substance while the plasticized consumable substance is in the second section of the twin-screw extruder.

7. The process of claim 1, further comprising drying the composite consumable food product.

8. The process of claim 7, wherein the composite consumable food product is dried to a moisture content of less than about 15 percent.

9. The process of claim 1, wherein the second foodstuff comprises wheat, barley, maize, rice flour, semolina, or mixtures thereof and water.

10. The process of claim 9, wherein the second foodstuff further comprises one or more additional additives selected from the group consisting of starch, sugar, fat or oil, a source of plant fiber, non-fatty milk solids from milk, vitamins, antioxidants, trace elements, flavorings, colorings, and mixtures thereof.

11. The process of claim 10, wherein the starch comprises wheat, barley, rice, tapioca, potato, maize, or mixtures thereof.

12. The process of claim 10, wherein the sugar comprises sucrose, fructose, glucose, or mixtures thereof.

13. The process of claim 1, wherein the second foodstuff has a water content of about 14 to 23 percent and provides a plasticized consumable substance that is expanded.

14. The process of claim 1, wherein the second foodstuff has a water content of about 24 to 36 percent and provides a plasticized consumable substance that is substantially non-expanded.

15. The process of claim 14, further comprising the step of rolling and toasting the plasticized consumable substance to provide flakes.

16. The process of claim 1, wherein the first foodstuff comprises sugar, honey, water, or mixtures thereof.

17. The process of claim 16, wherein the first foodstuff further comprises milk powder, fruit or vegetable pulp or concentrate, cocoa powder, colorings, flavors, vitamins, trace elements, salt, spices, oils, materials or microorganisms with probiotic or prebiotic properties; functional plant extracts, or mixtures thereof.

18. The process of claim 16, wherein the sugar comprises sucrose, fructose, dextrose, raw cane sugar, or mixtures thereof.

19. The process of claim 1, wherein the first foodstuff comprises protein hydrolysate and fat.

20. The process of claim 19, wherein the first foodstuff further comprises colorings, flavorings, vitamins, trace elements, and mixtures thereof.

* * * * *